United States Patent [19]

Olschewski et al.

[11] Patent Number: 4,911,610
[45] Date of Patent: Mar. 27, 1990

[54] DRIVE MECHANISM FOR PUMPS

[75] Inventors: Armin Olschewski, Schweinfurt; Manfred Brandenstein, Eussenheim; Horst M. Ernst, Eltingshausen; Elmar Mause; Heinrich Kunkel, both of Schweinfurt, all of Fed. Rep. of Germany

[73] Assignee: SKF GmbH, Schweinfurt, Fed. Rep. of Germany

[21] Appl. No.: 193,886

[22] Filed: May 13, 1988

[30] Foreign Application Priority Data

May 14, 1987 [DE] Fed. Rep. of Germany ....... 3716028
May 14, 1987 [DE] Fed. Rep. of Germany ....... 3716098

[51] Int. Cl.⁴ ............................................. F04D 29/04
[52] U.S. Cl. ................................. 415/170.1; 384/517
[58] Field of Search .................. 415/170.1, 174.2, 112, 415/113, 140; 384/517, 483, 477

[56] References Cited

U.S. PATENT DOCUMENTS

| 2,542,902 | 2/1951 | Chubbuck | 415/170 A |
|---|---|---|---|
| 3,632,220 | 1/1972 | Lansinger et al. | 415/170 A X |
| 3,796,510 | 3/1974 | Korrienn et al. | 415/170 A |
| 3,838,899 | 10/1974 | Sampatacos | 384/517 |
| 3,934,966 | 1/1976 | Asberg | 415/170 A X |
| 3,981,610 | 9/1976 | Ernst et al. | 415/170 A X |

FOREIGN PATENT DOCUMENTS

| 635324 | 9/1959 | Italy | 415/170 A |
|---|---|---|---|
| 641183 | 8/1950 | United Kingdom | 415/170 A |

Primary Examiner—Robert E. Garrett
Assistant Examiner—John T. Kwon
Attorney, Agent, or Firm—Eugene E. Renz, Jr.

[57] ABSTRACT

In a drive device for pumps consisting of a pump impeller mounted in a pump chamber, a pump cover covers the pump chamber and has an extension and a bore passing from the pump chamber to the outside. A shaft is connected at its inner end to the pump impeller and at its outer end in a torsion-proof manner by way of a coupling element to a drive wheel. A bearing supports the shaft and drive wheel in the housing bore and extension respectively. The coupling element is formed by an external edge rigidly connected to the drive wheel and covers the outer bearing and the extension laterally on the outside. A cover plate with a center section connects in a torsion-proof manner to the shaft, and is adjusted to elastically adjust the cover plate relative to the pump cover either inward toward the pump chamber or outward away from the pump chamber, thereby providing for automatic adjustment of the radial and axial load-supporting bearings means to remove their play.

19 Claims, 7 Drawing Sheets

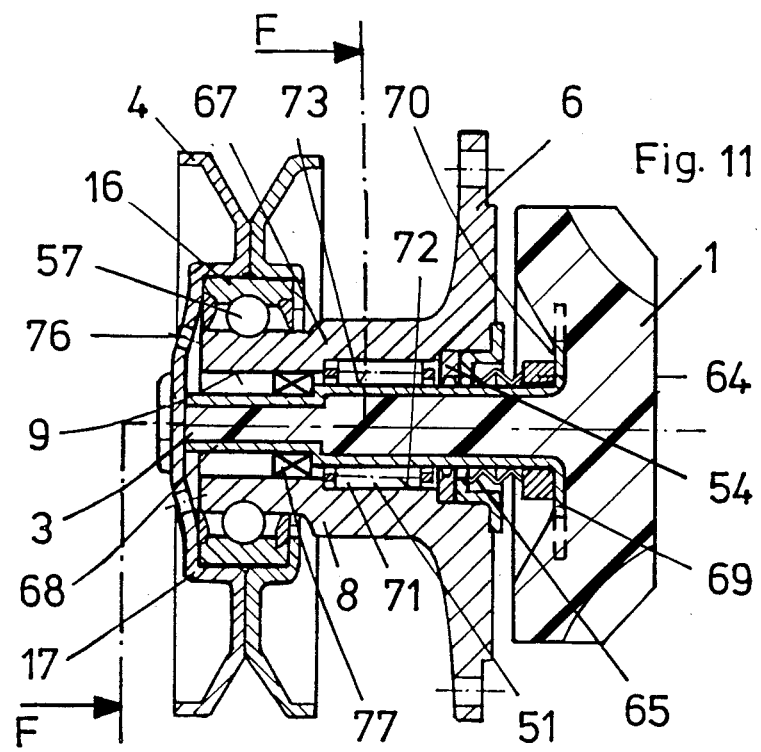
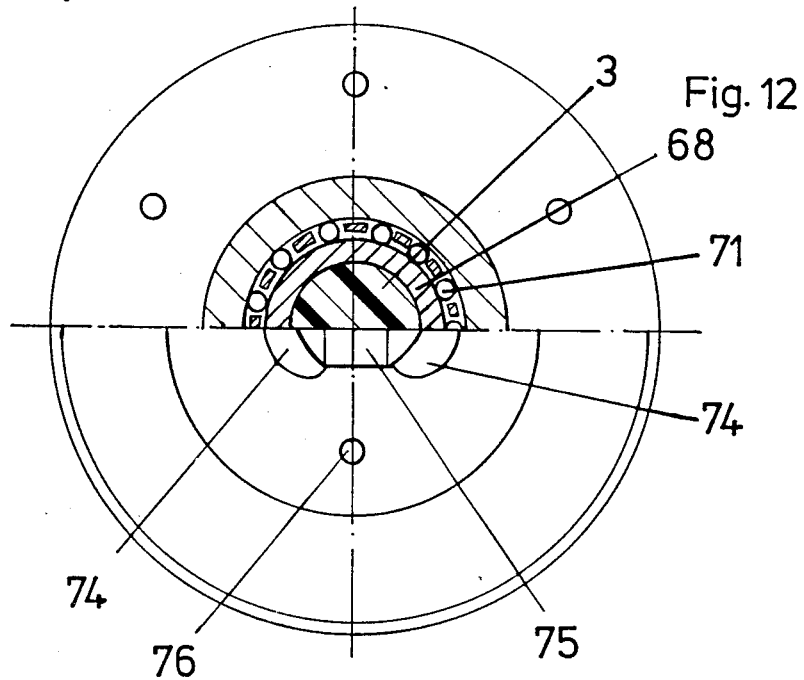

DRIVE MECHANISM FOR PUMPS

FIELD OF THE INVENTION

These drive systems generally comprise a pump impeller mounted in a pump chamber a drive shaft connected at its inner end of the pump impeller and by way of a coupling element to a drive wheel wherein the drive shaft is supported in at least one bearing seated in the housing bore and the drive wheel is supported in at least one outer bearing seated on a lateral surface of an extension.

BACKGROUND OF THE INVENTION

Drive systems of this general type are not new per se. For example, U.S. Pat. No. 2,568,646 shows a drive system wherein the outer bearing ring is formed by a two-row grooved ball bearing and the inner bearing is formed by a journal-bearing bushing mounted in the housing bore of the pump cover. This known system has several disadvantages and drawbacks. For example, it has been found that bearing play is present to a greater or lesser extent in both the inner and outer bearings. Consequently, the pump impeller runs roughly and generates noise. The shaft and drive wheel, therefore, exhibit radial axial vibrations within the individual bearing play. The shaft and drive wheel, therefore, tend to vibrate axially and radially by reason of the bearing play which results in damage and destruction of the components of the drive system such as the sealing lip of the sliding ring on the pump shaft.

By reason of the difference in bearing play between the inner and the outer bearing it is necessary to provide a bolt secured in a manner to allow the drive wheel to shift relative to the shaft of the impeller in these known drive systems. Attaching the bolt loosely in this way, however, is undesirable.

SUMMARY OF THE INVENTION

With the foregoing in mind, it is an object of the present invention to provide an improved drive system for pumps or the like of the general type described above which is characterized by novel features of construction and arrangement facilitating operation with very low vibrations and which is also compact in design. To this end, the drive system of the present invention includes a coupling element formed by an external edge of the drive wheel which covers the outer bearing and the extension laterally on the outside and by a cover plate with a central section connected in a torsion-proof manner to the drive shaft. The drive system also includes adjusting means which elastically adjust the cover plate relative to the pump cover either inward toward the pump chamber or outward away from the pump chamber and thereby automatically adjusting the radial and axial load supporting bearings to remove play. The design of the drive system according to the present invention permits use of a coupling element as a torsion-proof plate capable of transmitting high torques from the drive wheel to the shaft. Another advantage is that the inner and outer bearings are covered axially on the outside by the cover plate and thus protected from impact and foreign particulate matter such as dirt. Thus the drive system can be assembled to form a ready-to-install unit and mounted directly to the block of an internal combustion engine by means of a flange.

The elastic adjusting means functions to load at least one outer axial load bearing and/or at least one inner axial load bearing is adjusted to be free of play. Thus, vibrations of the drive wheel which would normally be transmitted with deleterious effects on the shaft to the pump impeller and to the sensitive seals of the pump chamber are therefore prevented.

Other more specific features of the present invention provide certain functional advantages. For example, in accordance with the present invention, the adjusting means comprises at least one compression spring located between a shoulder surface of the housing bore of the pump cover and an end surface of the pump impeller facing away from the pump chamber which adjusts the cover plate by way of the pump impeller and the shaft axially toward the pump chamber. In this arrangement each compression spring acts via the pump impeller and the shaft on the cover plate and thus presses the cover plate axially inwardly, namely toward the pump chamber. By this arrangement, at least one of the outer bearings which preferably is a single-row angular-contact bearing having lines of force converging axially inwardly at an angle toward the axis of the shaft is placed under axial load and adjusted to be free of play. The compression spring may be located in the housing bore of the housing cover and in this manner conserves space. Further, the compression spring may be located to press against one of the sealing rings sealing the pump chamber so that it provides a dual function, namely, adjusting the outer bearing to be free of play and contributing to forming a tight seal.

In accordance with another feature of the present invention, at least one of the inner rings and at least one of the outer rings are tensioned in the axial direction by elastically bendable radial connecting pieces of the cover plate. In accordance with another specific feature of the invention, the shoulder surface of the outer end of the shaft facing the pump chamber is formed by a top section of a mounting screw having a threaded section engageable in a threaded bore in an end surface of the outer end of the shaft. By this arrangement each radial and axial load supporting bearing can be designed economically as a conventional grooved ball bearing or a detachable ball bearing or a conical roller bearing.

In accordance with still another feature of the present invention, the play of the inner and outer bearings is eliminated by forcing at least one of the outer bearings and one of the inner bearings axially apart by a simple compression spring, e.g., a leaf or cup spring mounted on the outer end of the shaft.

In one embodiment of drive system in accordance with the present invention, the inner raceway of the outer roller bearing is designed as a groove worked into the outer diameter surface of the extension of the pump cover wherein the rolling elements engage to create a radial and axial guidance quality in the bearing. By this arrangement both the radial and axial forces of the drive wheel, e.g., a V-belt pulley, are absorbed by the outer rolling bearing which means that the inner rolling bearing is almost totally relieved of the drive forces of the drive wheel. Since the inner bearing therefore supports a relatively light load, its dimensions can be small and it can be easily installed in the housing bore in the extension of the pump cover.

In accordance with another feature of the present invention, the inner raceway of the outer rolling bearing is spaced a predetermined axial distance from the outer raceway of the inner rolling bearing on the pump cover extension. Thus, any possible tipping forces of the shaft and/or the drive wheel are absorbed jointly by the outer and inner roller bearings without causing excessive loads.

The extension of the pump cover is preferably made of a uniform wall thickness so that the pump cover can be produced rather economically from strip material such as strip steel by a pressing or deep-drawing process without cutting. Furthermore, by this construction, the inner raceways of the outer rolling bearing and the confronting raceways of the inner and outer rolling bearings on the pump cover extension can be easily hardened and produced with accurate dimensions in a single operation in a plunge-cut grinder. The changes in cross section on the pump cover extension wherein harmful stress peaks can arise during the heat treatment of the bearing raceways is relatively small.

In the drive system of the present invention, the extension of the pump cover may be provided with a collar stage located between the confronting raceways of the inner and outer bearings and this can be formed by suitably expanding or compressing the free end of the pump cover extension. This cover stage provides a means for changing and adjusting the effective diameters of the inner and outer raceways relative to one another. By reason of this flexibility, the effective diameter of the raceways can thus be adapted relatively easily to various applications with different loads on the drive wheel of the pump.

BRIEF DESCRIPTION OF THE DRAWINGS

These and other objects of the present invention and the various features and details of the operation and construction thereof are hereinafter more fully set forth with reference to the accompanying drawings, wherein:

FIG. 11 is a longitudinal transverse sectional view through still a further modified form of drive system in accordance with the present invention;

FIG. 12 is a partial enlarged cross sectional view taken along lines F—F in FIG. 11;

DETAILED DESCRIPTION OF THE PREFERRED EMBODIMENT

Figure 1:
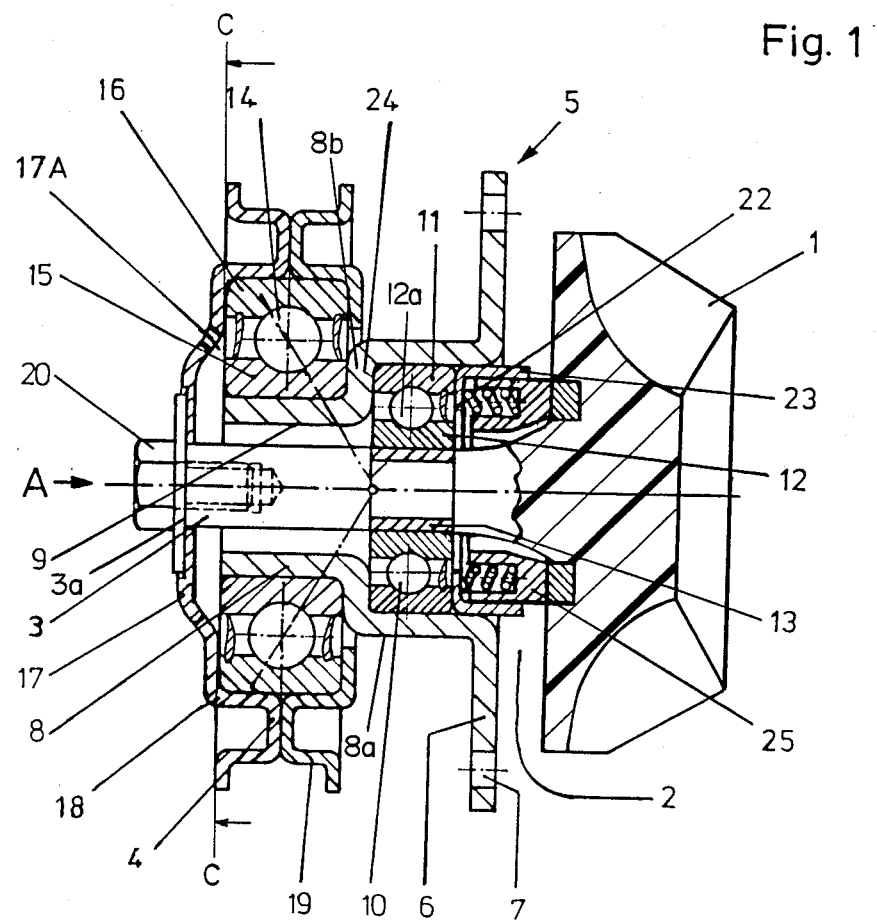
FIG. 1 is a longitudinal sectional view through a drive device.

Referring now to the drawings and particularly to FIG. 1 thereof, there is shown a drive mechanism for actuating a water pump to cool an internal combustion engine of a motor vehicle. The drive system as best illustrated includes a pump impeller 1 mounted in a pump chamber 2 of the engine block of an internal combustion engine (not shown). The pump impeller 1 is connected at one end of a shaft 3 in a torsion proof manner and mounts at its opposite end a coupling element and is connected at its opposite end by way of a coupling element to a drive wheel 4 of a conventional belt drive.

A pump cover 5 made of sheet metal circumscribes and envelopes pump chamber 2. As best illustrated in FIG. 1, pump cover 5 has a flange section 6 having a plurality of circumferentially spaced axially extending through holes 7 for securing the drive assembly to the engine block to mount pump cover 5 thereto.

Pump cover 5 has a stepped tubular extension which projects axially from the pump cover 5 comprising a first section 8 projecting rearwardly in the direction of the axis of the shaft 3 having a bore 9 circumscribing the shaft 3. The shaft 3 is supported in an inner bearing 10 seated in housing bore 9 wherein the outer ring 11a of the bearing abuts the radial wall connecting the stepped tubular extensions 8a and 8b. In the present instance, the bearing 10 is a conventional single row grooved ball bearing having an outer ring 11 with a grooved outer raceway, an inner ring 12 with a groove shaped inner raceway 12a and a plurality of spherical rolling elements in the annular space between the rings. Inner ring 12 seats on a journal bushing 13 rigidly mounted on shaft 3 which allows small axial displacements of the inner ring 12 but without significant sliding wear.

Drive wheel 4 is mounted on an outer bearing 14 which is in the present instance a conventional ball bearing with spherical roller elements which absorbs both radial and axial forces. The inner ring 15 is seated on a lateral surface extension 8b which is stepped down radially to reduce the radial space taken up by the drive system. Outer bearing ring 16 is held in place in a bore of drive wheel 4. The shaft 3 is connected to drive wheel 4 in a torsion-proof manner via a coupling element broadly designated C. In the present instance the coupling element C is formed by a cover plate 17 made of sheet metal which overlies both outer bearing 14 and extension 8a of housing cover 5 laterally on the outside. Cover plate 17 has a profiled outer edge configuration 18 which extends radially around and envelopes part of the outer bearing ring 16. The profiled outer edge 18 secured to a complementary flange ring 19 by simple welding forms the drive wheel 4 of the belt drive.

Figure 2:
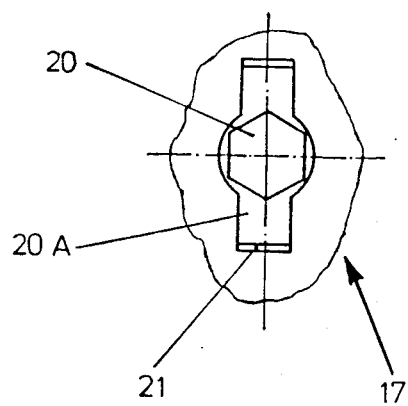
FIG. 2 is a partial fragmentary end view of the drive system taken in the direction of the arrow A of FIG. 1.

A cover plate 17 which mounts a bar washer 20a permanently connected thereto at its central section is attached by way of a screw 20 to an axial end face of 3a of shaft 3 facing away from the pump chamber 2. As best shown in FIG. 2, bar washer 20a has radially outwardly extending bars which engage in a positive form locking manner in corresponding recesses 21 in the outer lateral surface of cover plate 17 and thus produce a torsion-proof connection between the central section 17a of cover plate 17 in shaft 3.

Screw 20 threads into a centrally located threaded bore in one axial end of the shaft 3. Screw 20 threads in the direction of rotation of the shaft 3 so that it is turned into its complementary threaded bore by the drive moment of drive wheel 4 and thereof tends to lock and does not loosen in the operation of the drive mechanism.

Adjustable means are provided for adjusting the radial and axial load supporting outer bearing 14 which automatically effects play eliminating adjustment of this bearing. In the present instance, the adjusting means comprises helical springs 22 under compression located inside a retaining ring 23 mounted in the housing bore 9. These springs act on cover plate 17 and press it elastically outwardly away from pump chamber 2 Outer bearing ring 11 of inner bearing 10 is fixed in place in housing bore 9 between an annular shoulder surface 24 formed in the housing bore 9 of pump cover 5 and an axial end surface of retaining ring 23. As illustrated, helical springs 22 are located on the periphery of a sealing ring 25.

Figure 3:
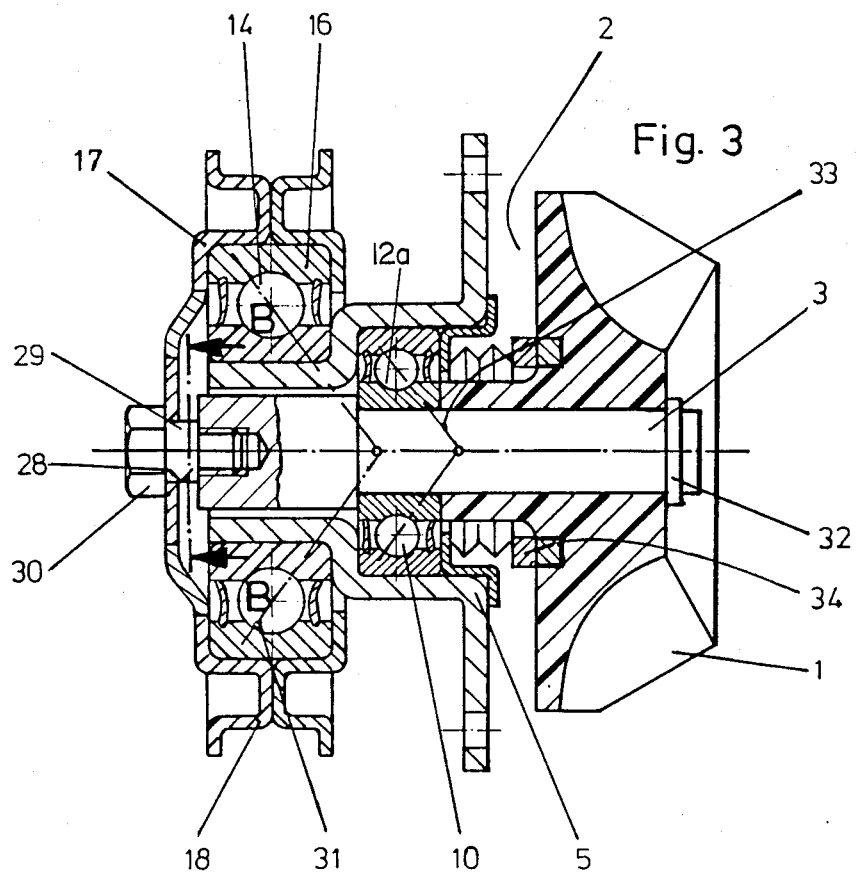
FIG. 3 is a longitudinal transverse sectional view similar to FIG. 1 showing a modified form of drive system in accordance with the present invention.
Figure 4:
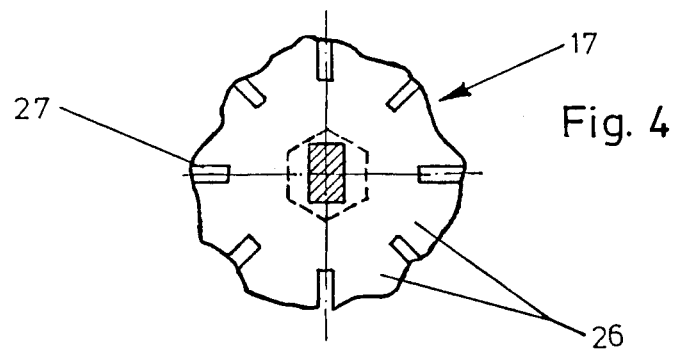
FIG. 4 is a fragmentary sectional view taken on lines B—B of FIG. 3.

In FIGS. 3 and 4, the pump impeller 1 is supported at the inner end of shaft 3 by press fit and is locked against axial displacement by a spring ring 32 so that it cannot be removed from the shaft 3.

Inner bearing assembly is also a single row angular contact ball bearing positioned so that the lines of force 33-converge axially inwardly at an angle toward the axis of the shaft 3. By this arrangement the elastic force of the tabs 26 of cover plate 17 is absorbed by the inner bearing assembly 10 in the direction of the lines of forces 33 and by the outer bearing assembly 14 in the direction of the lines of forces 31.

A sealing ring is mounted between the outer bearing ring 11 of inner bearing assembly 10 and pump impeller 1 which forms a sliding seal against an opposing end surface 1b of pump impeller 1. By this arrangement the axial compressive force exerted by sealing ring 34 on pump impeller 1 is much smaller than the resulting axial elastic force of tabs 26 of/cover plate 17.

Figure 5:
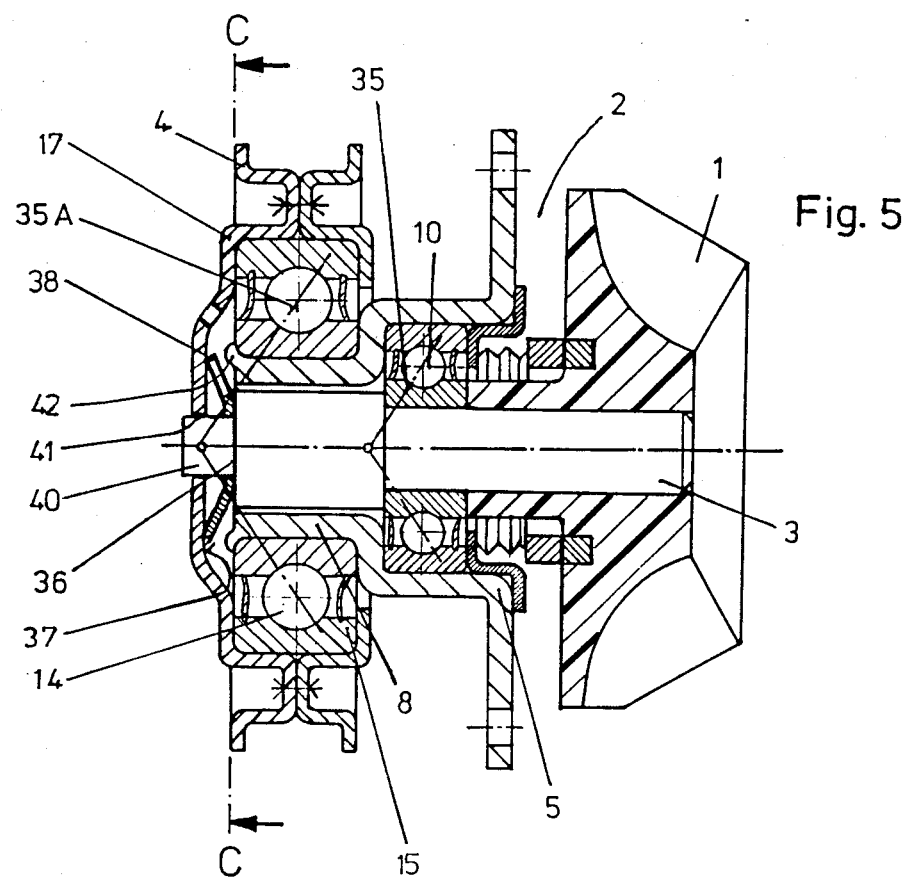
FIG. 5 is a transverse longitudinal sectional view through a further modified form of drive system in accordance with the present invention.
Figure 6:
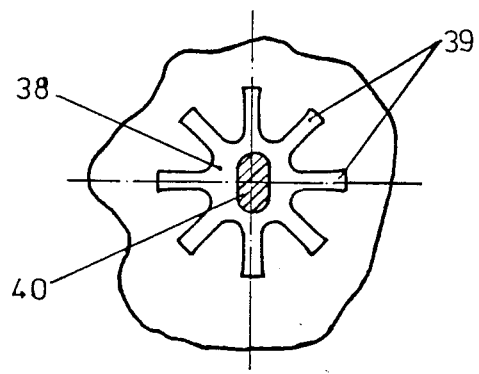
FIG. 6 is a partial side elevational view taken along lines C—C of FIG. 5.

There is shown a further modified drive assembly in accordance with the present invention in FIGS. 5 and 6. This arrangement similar to the previously described embodiments has radial and axial force supporting angular contact roller bearings comprising the outer bearing assembly 14 and a radial and axially force supporting angular contact roller bearing as the inner bearing ring assembly 10. In this instance, the bearing assemblies 10 and 14 have lines of force 35 and 35a respectively, which converge axially outwardly at an angle data toward the axis of shaft 3.

In accordance with this embodiment of the invention, the adjusting means are formed by a compression spring 38 mounted between a shoulder surface 36 of the outer end of shaft 3 facing away from the pump chamber 2 and a lateral surface 37 of the central section of cover plate 17 confronting or facing pump chamber 2.

In accordance with the embodiment of the invention illustrated in FIGS. 5 and 6, the play eliminating adjusting means are designed as a cup spring 38 having radially outwardly directed elastic arms or finger 39 which press elastically against lateral surface 37. Cup spring 38 has a non-circular central bore surface in the present instance oval shaped which is seated on a pin 40 having a complementary oval cross section on the outer end of shaft 3 so that it is secured against rotation on the shaft 3 in a positive form locking manner. The elastic arms 39 terminate in sharp edges at their free ends which penetrate or pierce lateral surface 37 of cover plate 17 which is made of relatively soft strip steel and this inter-engaging action prevents rotation of the arms.

The central annular section of cover plate 17 has an axial center bore 41 of a cross section adapted to the shape of oval pin 14 of shaft 3 to provide a form locking connection. In this way the drive moment transmitted by drive wheel 4 to the cover plate is transmitted to shaft 3 in part via spring plate 38 and in part via bore 41 of the center section of cover plate 17 to shaft 3.

The elastic force of arms 39 pretensions inner ring bearing assembly 10 axially against the outer bearing assembly 14. The inner ring 15 of outer bearing assembly 14 is displaced away from the pump chamber by means of its rolling elements. The outer end surface 8a of pump cover extension 8 has peened over radial projections 42 which seat or grip behind the outer end surface of inner ring 15 and retain the inner ring axially on extension 8 of pump cover 5.

Figure 7:
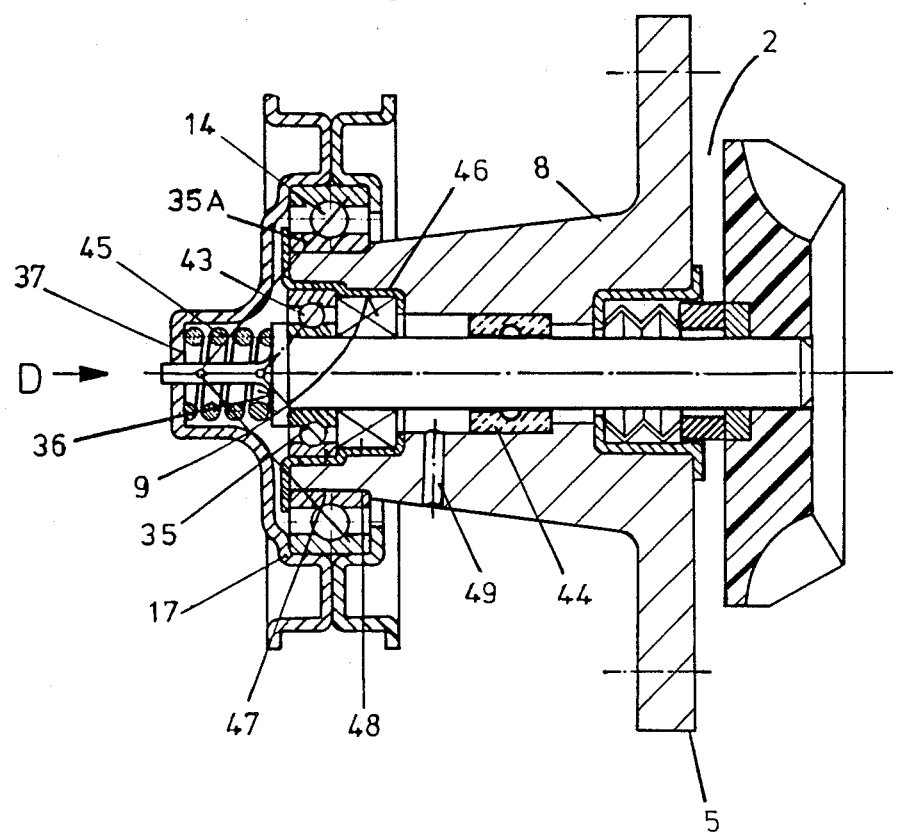
FIG. 7 is a longitudinal sectional view through still another modified form of drive system in accordance with the present invention.
Figure 8:
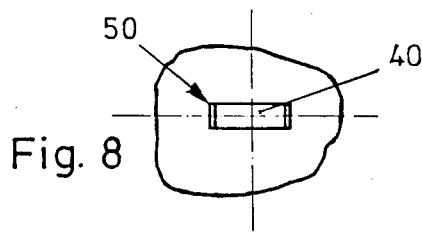
FIG. 8 is a fragmentary end view taken in the direction of the arrow D in FIG. 7.

There is shown a further modification of drive system in accordance with the present invention in FIGS. 7 and 8. In accordance with this embodiment of the invention, pump cover 5 is made of a vibration damping plastic produced by conventional injecting molding process. In accordance with this embodiment of the invention, an external single row angular contact ball bearing 43 made of conventional rolling bearing steel and an internal cylindrical journal bearing 44 of a self-lubricating ceramic material comprising the inner bearing assembly are mounted in housing bore 9 of pump cover 5. Outer bearing assembly 14 and external angular contact ball bearing, 43 have lines of force 35 and 35a respectively which converge at an angle axially inwardly toward the axis of shaft 3.

Adjusting means in accordance with this embodiment consist of helical spring 45 installed under compression between a shoulder surface 36 of the outer end of shaft 3 pointing away from pump chamber 2 and a lateral surface 37 of the center section of 17a of cover plate 17 facing toward pump chamber 2. Helical spring 45 pushes cover plate 17 away from pump chamber 2 so that outer bearing assembly 14 and external inner bearing assembly 43 are pretensioned against each other and adjusted in a manner to be free of play.

A linear plate 46 is cast inside pump cover 5 to serve as the housing bore 9 for the outer bearing ring 47 of external bearing assembly 43 and as the seating surface for a sliding seal 48 providing an inward seal. Journal bearing 44 is lubricated at least in part with the flow of medium of the pump such as glycol. A through hole 49 is machined into extension 8 of the housing cover 5. This through hole passes from the inside to the outside to allow any lubricant or pump flow medium which may have penetrated through journal bearing 44 to escape to the ambient atmosphere. The central section 17a of cover plate 17 has a slot-like opening 50 extending axially to receive a correspondingly designed pin 40 on the outer end of shaft 3. This arrangement prevents torsion but permits axial sliding of the cover plate 17 on the shaft 3

Figure 9:
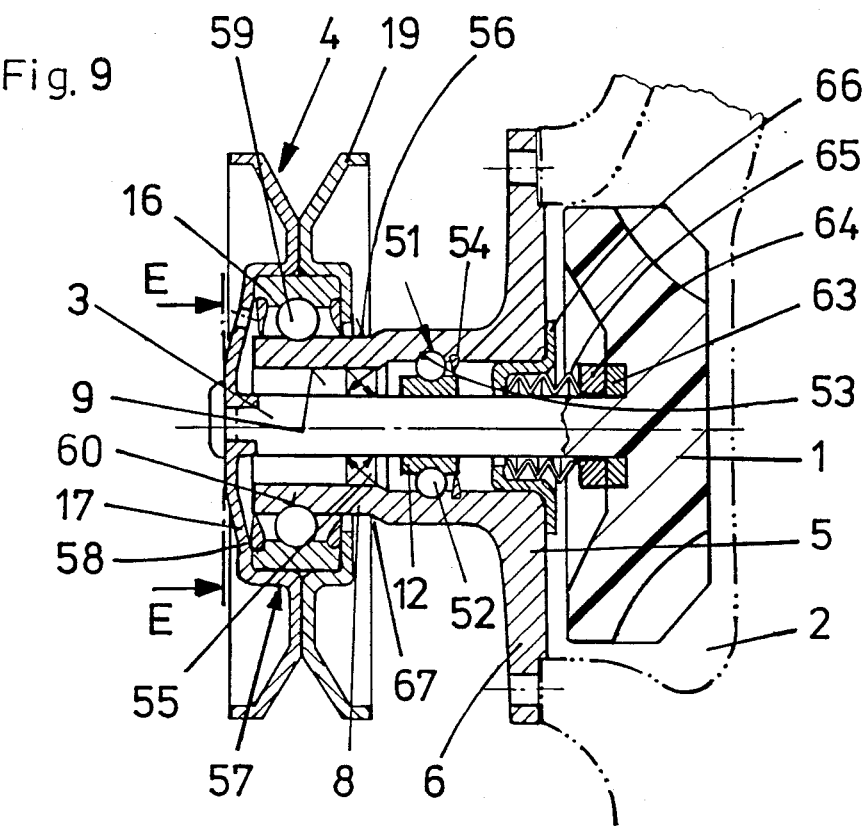
FIG. 9 is a longitudinal sectional view through still another modified form of drive system in accordance with the present invention.

FIG. 9 shows a further modification of drive assembly, in accordance with the present invention for a water pump for cooling the internal combustion engine of a motor vehicle. This drive assembly is similar in overall configuration to that described above and includes a pump impeller 1 located in a pump chamber 2 in the engine block (See broken lines in FIG. 9) of an internal combustion engine. Shaft 3 mounts at its inner end the pump impeller 1 and a cover plate 17 at its outer axial end. Cover plate 17 which is made of sheet steel forms together with a flange ring 19 spot welded to it, a drive wheel 4 having a V-belt profile. Pump cover 5 which covers pump chamber 2 has a flange section 6 extending generally in a radial direction and a tubular extension 8 projecting axially outwardly from the pump chamber 2. Extension 8 is connected integrally at its inner end to flange section 6. Pump cover 5 may be manufactured from strip material of hardenable steel by pressing and drawing in a non-cutting manner so that its extension 8 and flange section 6 have an essentially uniform wall thickness.

In accordance with the embodiment of the invention illustrated in FIG. 9, the inner bearing comprises a grooved ball bearing 51 with an inner bearing ring 12 mounted on the shaft 3 and a single row of spherical rolling elements 52. Inner bearing ring 12 and rolling elements 52 are made of hardened bearing steel. Balls 52 roll between a groove shaped outer raceway 53 formed integrally in the housing bore by machining in a groove shaped inner raceway 53a ground into a outer peripheral surface of inner bearing ring 12. Inner bearing 51 is seated by a sealing washer 54 on side facing the pump chamber 2. The sealing washer seats in a ring shape groove in housing bore 9 and slides on inner bearing ring 12.

On the side facing away from pump chamber 2, inner roller bearing 51 is sealed by a sealing ring 55 fixed in housing bore 9, the sealing lip of which slides on shaft 3. The bearing space between the two seals 54, 55 is filled with lubricating grease to lubricate inner rolling bearing 51.

Drive wheel 4 is supported in an outer bearing, which is braced against a radially inward-offset section of lateral surface 56 of extension 8.

The outer bearing is designed as a rolling bearing 57, which consists of an outer bearing ring 16 of rolling bearing steel fixed in a bore 9 and drive wheel 4, with a sealing washer 58 installed laterally in the ring, and a single row of spherical rolling elements 59 of roller bearing steel. Rolling elements 59 roll between an outer raceway in the bore of outer bearing ring 57 and an inner raceway 60 machined directly into the radially inward-offset section of lateral surface 56.

The outer raceway and inner raceway 60 of outer rolling bearing 57 are designed as grooves, and their cross section closely matches the contour of rolling elements 59.

To create a radial and axial guidance property in outer rolling bearing 57, rolling elements 59 engage radially in groove-shaped inner raceway 60. The outer roller bearing guides shaft 3 and pump impeller 1 in the axial direction and thus acts as a fixed bearing.

Pump impeller 1 and shaft 3 are made of a wear-resistant plastic by the injection-molding process and are connected integrally together. Inner bearing ring 12 is seated with an axial sliding fit on shaft 3. This is, therefore, installed in such a way that an axial sliding motion of shaft 3 in the bore of inner bearing ring 12 is allowed. Thus, inner rolling bearing 51 can absorb essentially only radial forces and, therefore, serves as a loose bearing.

Figure 10:
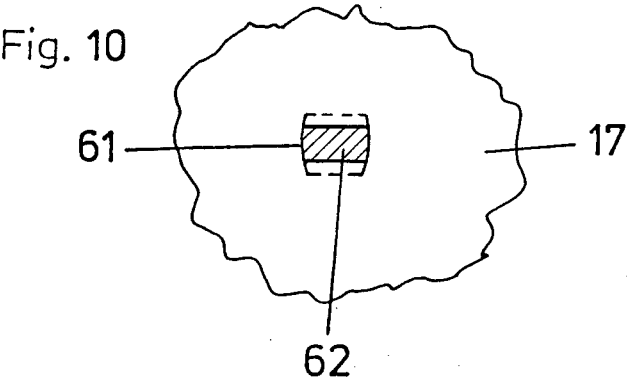
FIG. 10 is an enlarged cross sectional view taken along lines E—E of FIG. 9.

As can be seen from the illustration in FIG. 10, cover plate 17 has a slotlike opening passing axially through the center. A terminal pin 62 of shaft 3 engages in a form-locking manner through this opening 61 and extends to the outside, where it is peened over by the ultrasonic method against the outer lateral surface of cover plate 17 and welded thereto. In this way, cover plate 17 is secured on terminal pin 62 not only against turning but also against displacement in the two axial directions.

Pump impeller 1 has an axially outward-facing end surface with a metal wear ring 63 cast into it. A metal sealing ring 64 slides on a flat end surface of this wear ring 63. Sealing ring 64 is pressed by a bellows-like compression spring 65 against the end surface of wear ring 63 with a certain axial force. The compression spring 65 is set into the bore of a sheet metal cap 66 attached to pump cover 5.

Because of the axial force of compression spring 65, shaft 3 is pressed, together with cover plate 17, toward pump chamber 2. The outer bearing ring 16 is pushed toward pump chamber 2 and held there so that there is no axial play in outer rolling bearing 57.

Extension 8 has a collar stage 67 between inner raceway 60 of outer rolling bearing 57 and outer raceway 53 of inner rolling bearing 51.

FIG. 11 shows a modified drive unit for a pump for cooling an internal combustion engine. Outer rolling bearing 57 is similar to the outer bearing described in the preceding exemplary embodiment. Shaft 3 and pump impeller 1 are made of plastic and are connected integrally to each other.

In the present case, however, shaft 3 has a liner tube 68 of steel with a terminal flange 69 partially cast into pump impeller 1, this tube serving to transmit the torque of drive wheel 4. A metal sealing ring 64 slides on an end surface 70 of terminal flange 69 facing away from the pump chamber (not shown).

Inner rolling bearing 51 is formed by a needle roller assembly, comprising a pocket cage and needle-shaped rolling elements 71 inserted therein. Cylindrical outer raceway 72 of inner rolling bearing 51 is machined directly into housing bore 9 of extension 8.

Rolling elements 71 roll between this outer raceway 72 and a continuous axial cylindrical inner raceway 73 (without an axial contact flange) on the lateral surface of liner tube 68 (FIG. 12). Rolling elements 71 of rolling bearing 51 allow small axial movements of shaft 3, so that inner rolling bearing 51 can absorb only radial forces and thus serves as a loose bearing.

To hold outer bearing ring 16 of outer rolling bearing 57 in place without play, cover plate 17 is connected in a slide-proof manner to the outer end of shaft 3 by two flanged-over edges 74 on the other end of liner tube 68. The two flanged-over edges 74 extend in each case through a hole in cover plate 17 to the outside and grip behind cover plate 17. The, thus, produce a torsion-proof connection between liner tube 68 and cover plate 17. A narrow center section 75 of cover plate 17 engages in a radial, through-groove on the end surface of the free end of shaft 3. Cover plate 17 has in addition two diametrically opposing through-holes 76 for leaks (FIG. 12).

Between pump cover 5 and opposing end surface 70 of pump impeller 1 is a compression spring 65, which presses by way of a sliding sealing ring 64 against end surface 70.

In the present case, inner rolling bearing 51 is lubricated in part by the pump liquid, e.g., a mixture of glycol and water. Small amounts of the pump liquid pass through the sliding gap between sealing ring 64 and terminal flange 69 of liner tube 68 and reach inner rolling bearing 51.

On the side of inner rolling bearing 51 facing away from the pump chamber, a sealing ring 77 is mounted on shaft 3, the sealing lip of which slides in housing bore 2 of extension 8.

Figure 13:
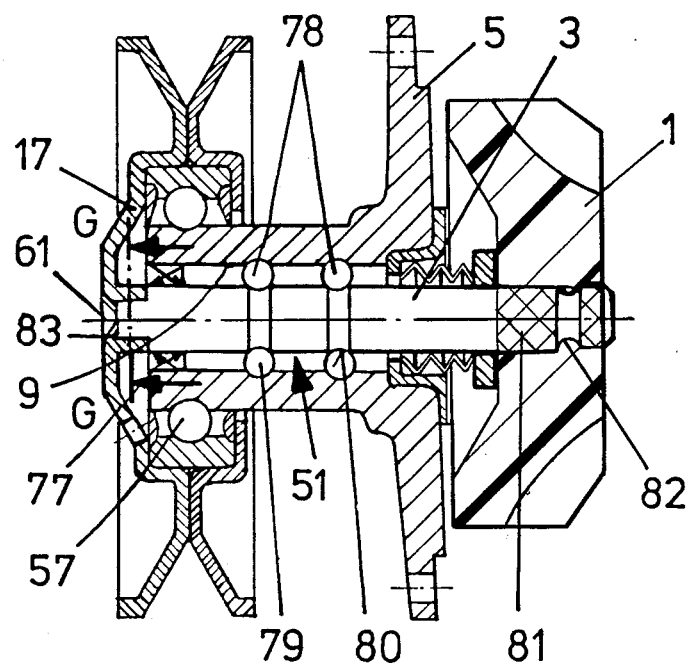
FIG. 13 is a transverse longitudinal sectional view through another modified drive system in accordance with the present invention.
Figure 14:
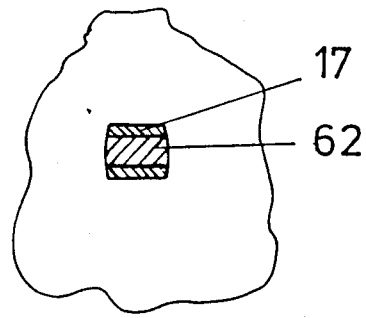
FIG. 14 is a cross sectional view taken on lines G—G of FIG. 13.

FIGS. 13 and 14 show an additional modified drive device of a cooling water pump.

Inner rolling bearing 51 has in this case two rows of spherical rolling elements 78. Each row of rolling elements 78 rolls between a groove-shaped outer raceway 79 machined directly into housing bore 9 and a groove-shaped inner raceway 80 machined directly into metal shaft 3.

Pump impeller 1, which is made of plastic, is seated with its central bore on a knurled lateral surface section 81 of the inner end of shaft 3. It is held axially in place on this section 81 by radially inward-pointing projections 82, which snap into a ring-shaped groove in shaft 3.

The outer end of shaft 3 has a flattened pin portion 62, which passes through a central opening 61 in cover plate 17 and is rigidly connected by spot welds 83 to cover plate 17.

The exemplary embodiments indicated above can be modified in their design without leaving the scope of the basic idea of the invention.

For example, several rolling bearings can be mounted next to each other as outer bearings on the lateral surface of the extension of the pump cover. These rolling bearings do not need to support axial loads. On the contrary, they can be installed to support radial loads exclusively. In this case, at least one of the inner bearings must be set up to support radial and axial loads, which means that this bearing is subjected to elastic load by the adjusting means either inward toward the pump chamber or outward away from the pump chamber and thus positioned free of play.

The outer and inner rolling bearings do not need to be of the single-row design. Instead, both rolling bearings can have two or more adjacent rows of rolling elements.

In correspondence with the number of rows of rolling elements, the outer rolling bearing can then have inner raceways machined directly into the lateral surface of the tubular extension, and the inner bearing can have outer raceways machined directly into the bore surface of the tubular extension.

In addition, the outer roller bearing can also be arranged to allow an axial movement of the drive wheel relative to the extension of the pump cover (loose bearing). In this case, at least one row of rolling elements of the inner rolling bearing must be installed in the housing bore so as to absorb axial load, so that this bearing can thus act as a fixed bearing and absorb the axial forces of the pump impeller and of the drive wheel.

While particular embodiments of the present invention have been illustrated and described herein, it is not intended to limit the invention, and changes and modifications may be made therein within the scope of the following claims. In many cases, an angular-contact journal bearing can even be provided as the outer and/or inner bearing in the drive device. A chain wheel or a gear wheel connected to the outer edge of the cover plate, for example, can be used as the drive wheel of the drive device.

What is claimed is:

1. The combination comprising a pump impeller (1) mounted in a pump chamber (2), a pump cover (5) covering the pump chamber (2) having a extension (8) and a bore (9) passing from the pump chamber to the outside, and a shaft (3) connected at its inner end to the pump impeller (1) and at its outer end to a drive wheel (4), first and second bearing means supporting said shaft and drive wheel in the housing bore and extension respectively, coupling element means for connecting one of said bearing means and said shaft in a torsion proof manner, and an adjusting means (22, 26, 38, 45, 65,) operable to elastically adjust or effect displacement of said pump cover (5) and said coupling element relative to one another to thereby provide means for automatic adjustment of the radial and axial loads, thereby effecting displacement of the inner and outer rings of the first and second bearings means to thereby remove play.

2. Drive device according to claim 1, wherein at least one bearing means (14, 57) is provided for radial and axial support on the lateral surface of the extension (8) of the pump cover (5) and wherein each inner bearing (10, 51) has a seat or bearing surface which permits an axial displacement of the shaft (3) and wherein the cover plate (17) and the pump impeller (1) are fixed axially to the shaft (3), said adjusting means being formed by at least one compression spring (22, 65), which acts between a shoulder surface (24) of the housing bore (9) of the pump cover (5) pointing axially toward the pump chamber (2) and an end surface (25, 70) of the pump impeller (1) facing away from the pump chamber (2), and which is operable to adjust the cover plate (17) by way of the pump impeller (1) and the shaft (3) axially toward the pump chamber (2).

3. Drive device according to claim 2, wherein an outer bearing ring (11) of at least one inner bearing (10) is mounted in the housing bore (9) between the shoulder surface (24) of the housing (9) and the compression spring(s) (22).

4. Drive device according to claim 2, wherein said compression spring(s) (22) opposes a sealing ring (24) which is axially adjustable in the housing bore (9) of the pump cover (5) and which slides on an opposing end surface (25) of the pump impeller (1).

5. Drive device according to claim 1, wherein the shoulder surface of the outer end of the shaft (3) facing the pump chamber (2) is formed by the top section (3) of a mounting screw (29) with a threaded section screwed into a threaded hole in an end surface of the outer end of the shaft (3).

6. Drive device according to claim 5, wherein the mounting screw (29) has a shaft between the top section (30) and the threaded section with an unround cross section which is constant in the axial direction, said cross section passing through a correspondingly designed central opening (28) extending axially through the center section of the cover plate (17) to make a positive form-locking connection.

7. Drive device according to claim 1, wherein the outer bearing means (14) is designed as a rolling bearing with lines of force (31) which converge axially inward at an angle toward the axis of the shaft (3).

8. Drive device according to claim 1, wherein at least one outer bearing means (14) is provided for radial and axial support on the lateral surface of the extension (8) of the pump cover (5) and wherein at least one inner bearing (10) is designed as a roller bearing with lines of force (25) converging axially inward at an angle toward the axis of the shaft (3) and wherein said adjusting means are formed by at least one compression spring (38, 45) acting between a shoulder surface (36) of the outer end of the shaft (3) facing away from the pump chamber (2) and a lateral surface (37) of the central section of the cover plate (17) facing toward the pump chamber (2).

9. Drive device according to claim 8, characterized in that at least one outer bearing means (14) is designed as a roller bearing with lines of force (34) converging axially outward at an angle toward the axis of the shaft (3).

10. Drive device according to claim 1, wherein the outer bearing and the inner bearing are designed as roller bearings (57, 51) with at least one inner raceway (60 and 73, 80) and at least one outer raceway (53, 72, 79) for the rolling elements (50 and 52, 71, 78), where both the inner raceway(s) (60) of the outer roller bearing (57) and the outer raceway(s) (53, 72, 79) of the inner roller bearing (51) are machined directly into the lateral surfaces (56) and bore surface (9), respectively, of the tubular extension (8) of the pump cover (5).

11. Drive device according to claim 10, wherein at least one inner raceway (60) of the outer roller bearing (57) is designed as a groove, in which the associated rolling elements (52) engage to create a radial and axial guidance quality in this roller bearing (57).

12. Drive device according to claim 10, wherein at least one inner raceway (60) of the outer rolling bearing (57) has a certain axial distance from at least one outer raceway (53, 72, 79) of the inner roller bearing (51).

13. Drive device according to claim 12, wherein the extension (8) of the pump cover (5) has a collar stage (67) located between an inner raceway (60) of the outer roller bearing (57) and an outer raceway (53, 72) of the inner roller bearing (51).

14. Drive device according to claim 13, wherein the inner roller bearing (51) is mounted as a loose bearing which allows small axial movements of the shaft (3).

15. Drive device according to claim 14, wherein said cover plate (17) is connected to the outer end of the shaft (3) in such a manner that axial displacement in the outward direction is impossible, a compression spring being provided between the pump cover (5) and an end surface (70) of the pump impeller (1) opposite said cover to permit adjustment of the outer roller bearing (57) so that it has no play.

16. Drive device according to claim 1, wherein the extension (8) of the pump cover (5) has an essentially uniform wall thickness.

17. Drive device according to claim 1, wherein the extension (8) of the pump cover (5) is connected integrally at its inner end to a flange section (6) extending essentially in the radial direction.

18. Drive device according to claim 1, wherein the shaft (3) and the pump impeller (1) are connected integrally together.

19. Drive device for pumps consisting of a pump impeller (1) mounted in a pump chamber (2), a pump cover (5) covering the pump chamber (2), having an extension (8) and a bore (9) passing from the pump chamber to the outside, and a shaft (3) connected at its inner end to the pump impeller and at its outer end in a torsion-proof manner by way of a coupling element to a drive wheel (4) and bearing means supporting said shaft and drive wheel in the housing bore and extension respectively, the coupling element being formed by an external edge (18) rigidly connected to the drive wheel (4) and covering the outer bearing means (14, 57) and the extension (8) laterally on the outside and a cover plate (17) with a center section connected in a torsion-proof manner to the shaft (3), and adjusting means (22, 26, 38, 45, 65) operable to elastically adjust the cover plate (17) relative to the pump cover (5) either inward toward the pump chamber (2) or outward away from the pump chamber (2), thereby providing means for automatic adjustment of the radial and axial loadsupporting bearing means (10, 14, 51; 57) to remove their play, said bearing means comprising at least one outer bearing means (14) on the lateral surface of the extension (8) of the pump cover (5) to support radial and axial loads and at least one inner bearing means (10) consisting of a rolling bearing with lines of force (33) which converge at an angle axially inward toward the axis of the shaft (3), said adjusting means being formed by thin, radial, elastically bendable tabs (26) of the cover plate (17) distributed uniformly around the circumference, and wherein the center section of the cover plate (17) is axially adjustable on the shaft (3) and presses elastically against a shoulder surface connected to the outer end of the shaft (3), which face the pump chamber (2).

* * * * *